INVENTORS
EDWIN I. BLUMENTHAL
FRANK A. LOPEZ

April 24, 1962 E. I. BLUMENTHAL ET AL 3,031,136
CARD SENSING DEVICE
Filed June 13, 1955 9 Sheets-Sheet 4
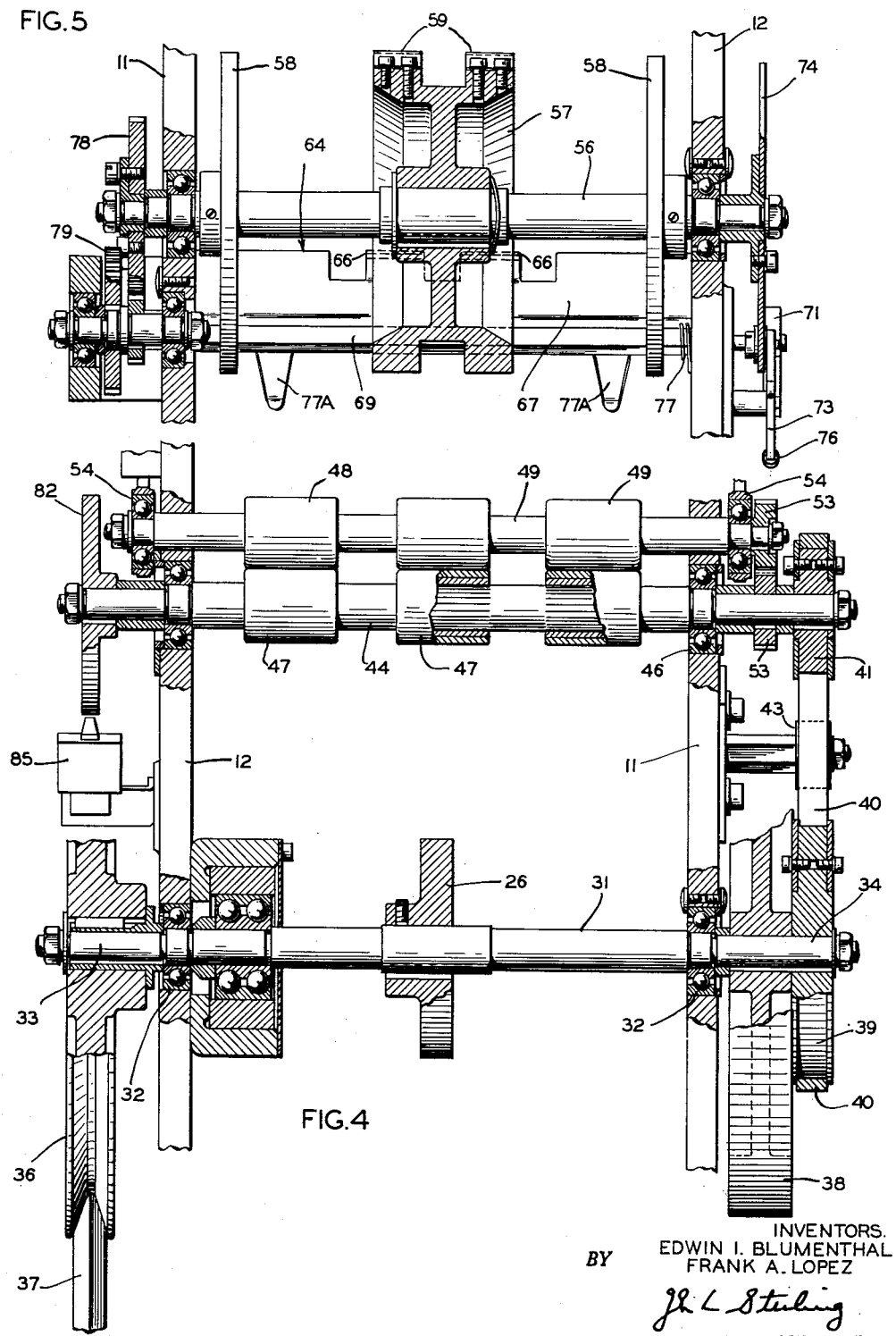
INVENTORS.
EDWIN I. BLUMENTHAL
FRANK A. LOPEZ
BY
ATTORNEY.

April 24, 1962 E. I. BLUMENTHAL ET AL 3,031,136
CARD SENSING DEVICE
Filed June 13, 1955 9 Sheets-Sheet 5

INVENTORS
EDWIN I. BLUMENTHAL
FRANK A. LOPEZ
BY
Jh L Sterling
ATTORNEY

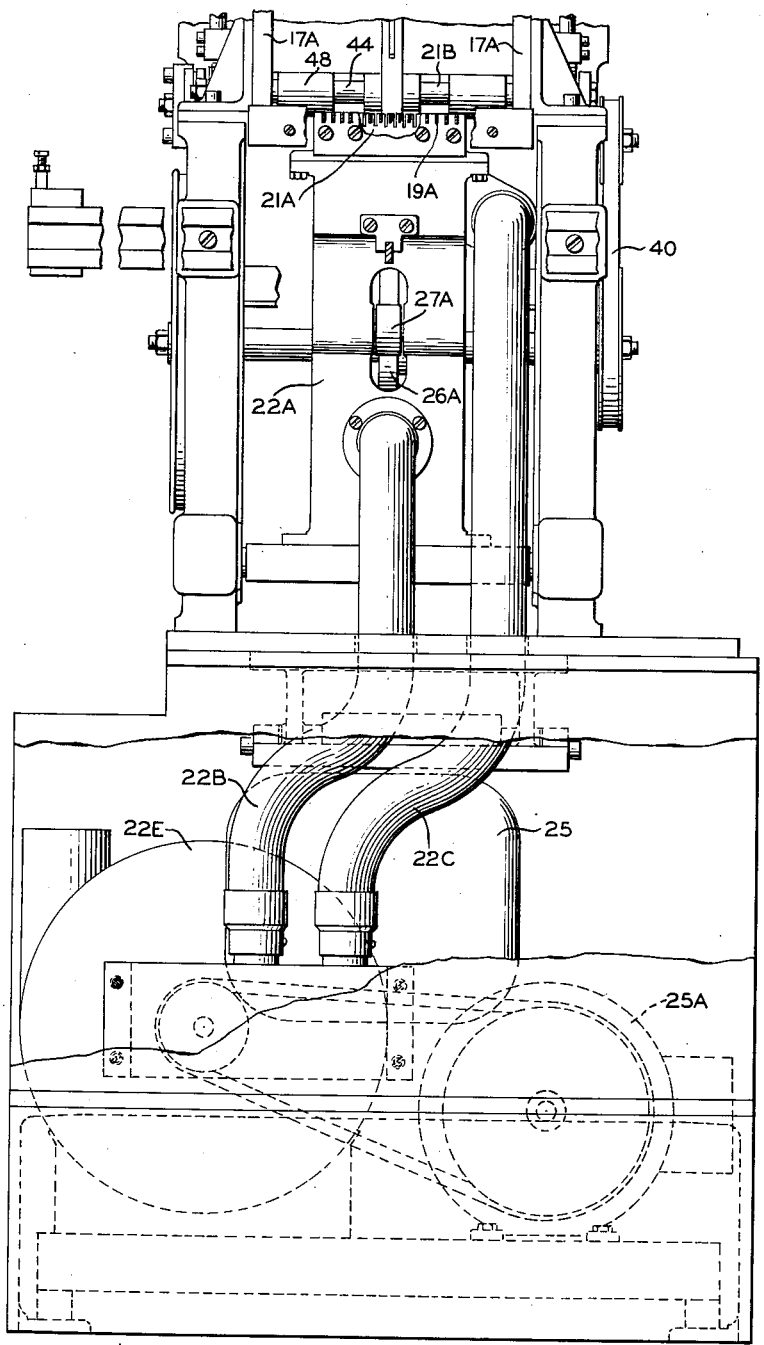

April 24, 1962    E. I. BLUMENTHAL ET AL    3,031,136
CARD SENSING DEVICE

Filed June 13, 1955    9 Sheets-Sheet 7

INVENTORS
EDWIN I. BLUMENTHAL
FRANK A. LOPEZ
BY *John L. Sterling*
ATTORNEY

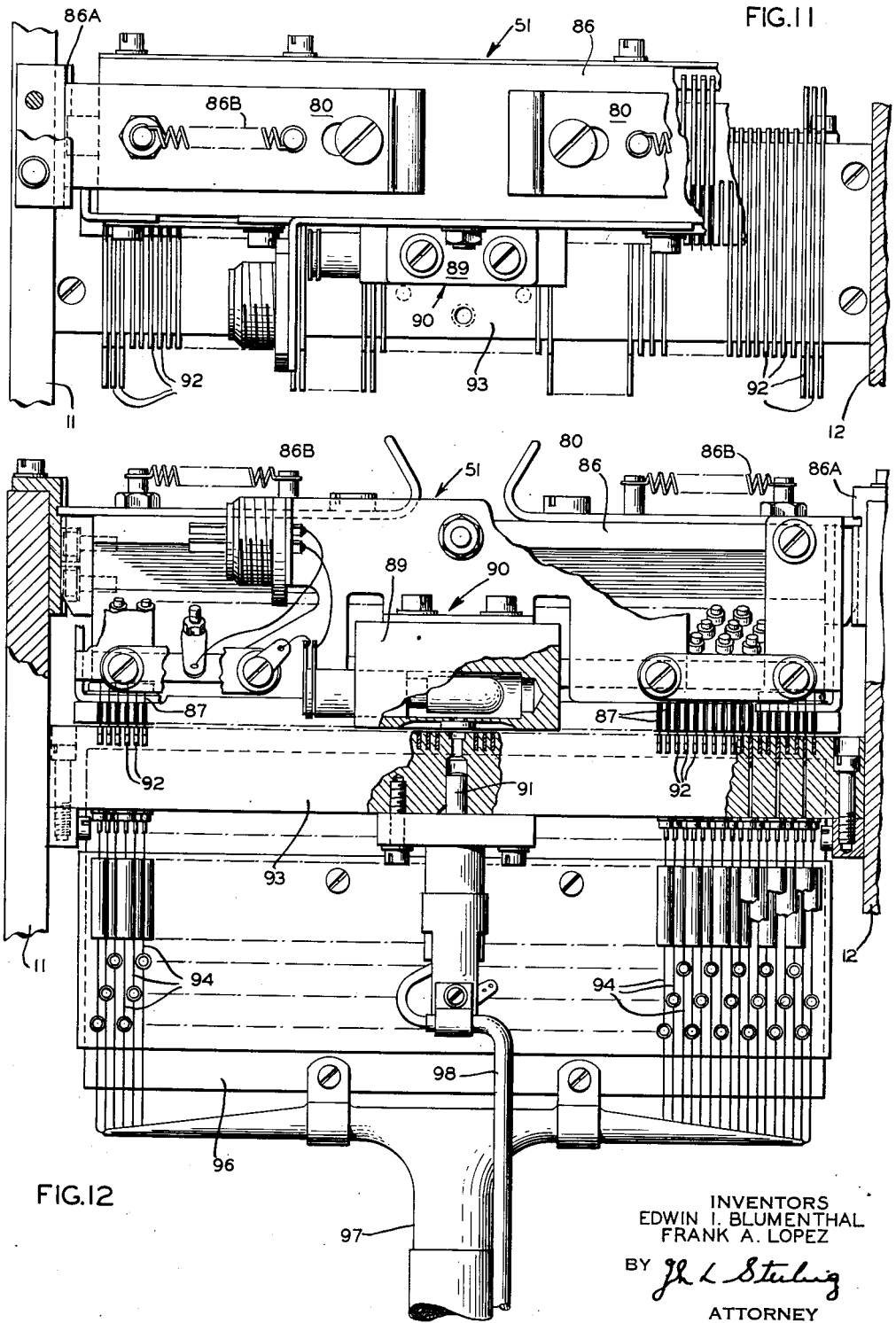

April 24, 1962 E. I. BLUMENTHAL ET AL 3,031,136
CARD SENSING DEVICE
Filed June 13, 1955 9 Sheets-Sheet 9

INVENTORS
EDWIN I. BLUMENTHAL
FRANK A. LOPEZ
BY John L. Sterling
ATTORNEY

United States Patent Office 3,031,136
Patented Apr. 24, 1962

3,031,136
CARD SENSING DEVICE
Edwin I. Blumenthal, Conshohocken, and Frank A. Lopez, Elkins Park, Pa., assignors to Sperry Rand Corporation, a corporation of Delaware
Filed June 13, 1955, Ser. No. 514,860
12 Claims. (Cl. 235—61.11)

This invention relates to card sensing means and in particular to one particularly adapted for use in entering data on a magnetic tape to be used in an electronic computer.

The invention, in the present disclosure, makes use of a standard punched card having data designation positions defined by the point of intersection of eighty or ninety columns extending widthwise of the card and twelve rows extending lengthwise of the card. The cards are fed, upper edge first, from a supply bin through a plurality of stations at each of which the leading edge of the card, as well as each data perforation in row by row order, is sensed. The data punched in the card is transferred, through a magnetic core memory and a translator or encoder, to a magnetic tape in the form of coded information suitable for use in the computer, as fully explained in an application Serial No. 515,102, filed June 13, 1955.

A particular object of the invention is to provide a card sensing mechanism through which cards can be fed at high speed for sensing at two stations for the purpose of checking the data thereof and machine operations governed by a pulsing means which is controlled by the means for feeding the card through the sensing means.

A further object of the invention is to provide for the generation of a sprocket pulse for determining the proper time for reading each of the rows of punched holes in a card as it passes beneath the sensing means and for additionally generating a plurality of sprocket pulses, individually timed for each card, and controlled by the operation of the card feeding means.

A still further object of the invention is to provide for sprocket pulse generating in such manner that the pulse, in addition to controlling the sensing of the card can be employed in other operations, such, for example, as counting the rows of the card as the data positions therein are sensed, and energizing certain of the core windings of a memory unit.

Another object of the invention is to provide means for diverting the passage of error cards, after sensing, to an error bin by conditioning the mechanism periodically during sensing operations.

Other objects of the invention are to provide in a card sensing machine; a means for recording on and reading from a magnetizable member a pulse spot whereby a pulse can be transferred in synchronism with sensing and then erased; to provide a sensing member that can be readily detached from adjusting or replacing sensing brushes; to provide a detector operated by the feed of the card so that sensing of the card can be precisely controlled; to provide means for modifying the action of card feeding operations; and to provide pneumatic means for assisting in the feed of the card through the narrow throat of a supply bin whereby the cards will be fed to the sensing stations in spite of mutilation or unusual warping.

The foregoing and other objects of the invention particularly relating to the details of construction and operation will become apparent from the following description read in conjunction with the accompanying drawing, in which FIG. 1 is a view in elevation looking at the right side of the card sensing machine showing the feed roll driving mechanism and error card control means;

FIG. 4 is a vertical section taken on the line 4—4 of FIG. 1 showing the drive mechanism for the card feed rolls and the relative position of the magnetic drum and its associated parts;

FIG. 5 is a vertical section taken on the line 5—5 of FIG. 1 showing the card stacking drum and the error card deflecting device;

FIG. 7 is a view in front elevation of the card feeding means shown in FIG. 6;

FIG. 11 is a plan view of a card sensing unit mounted in the frame of the machine;

FIG. 12 is a view in front elevation of the card sensing means shown in FIG. 11.

Figure 1:
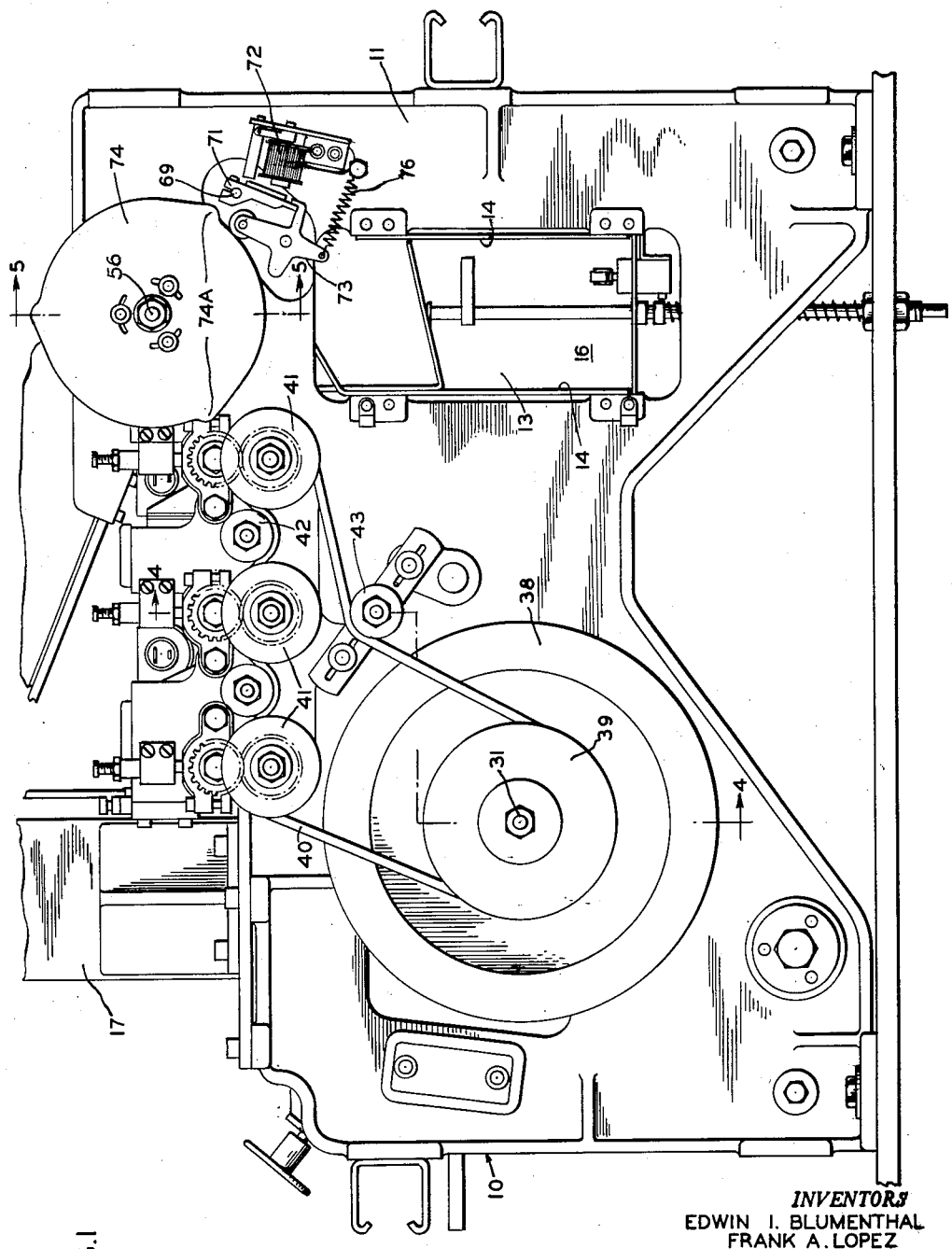
Figure 2:
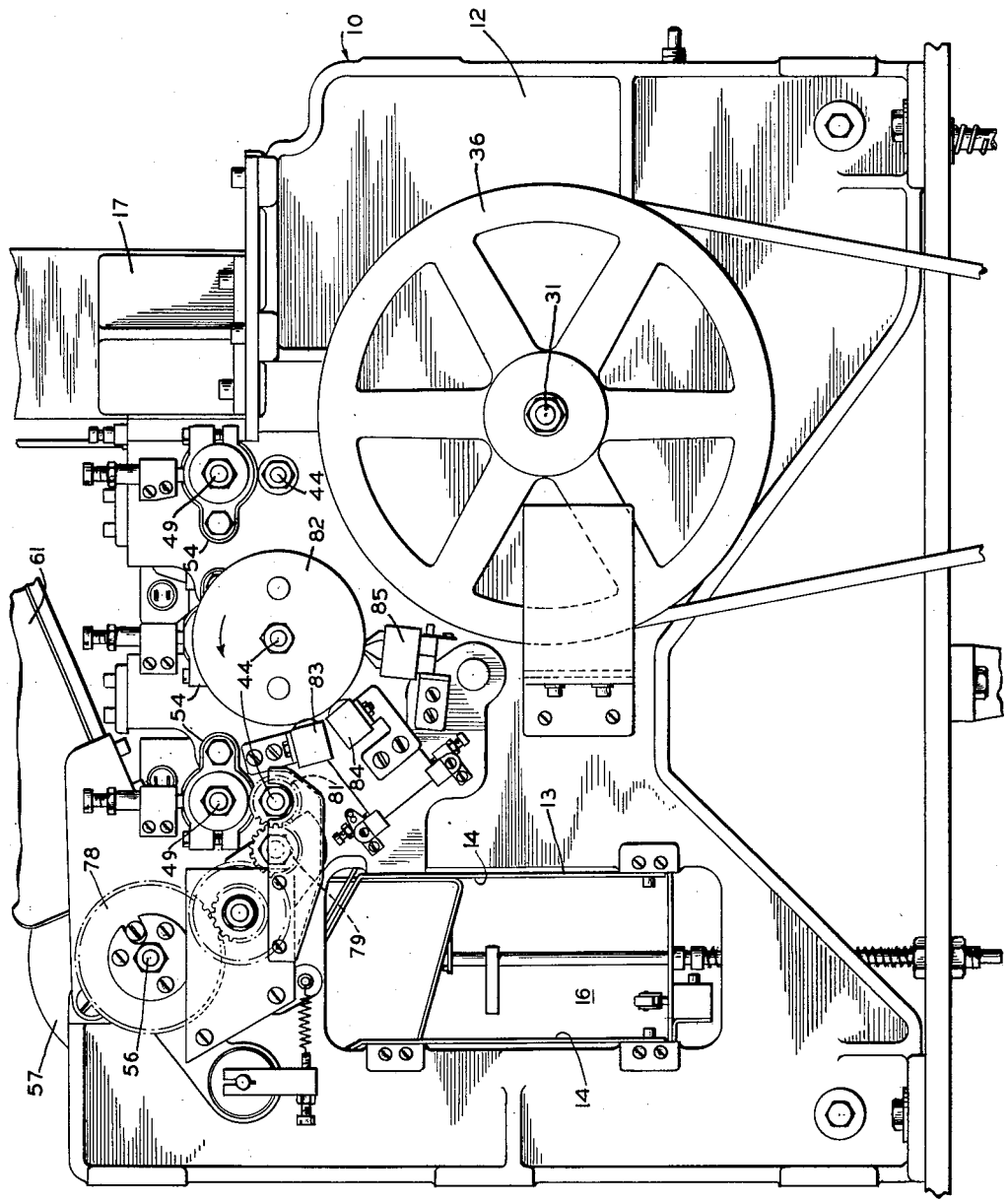
FIG. 2 is a view in elevation looking at the left of the machine shown in FIG. 1 and illustrating a sprocket pulse magnetic drum and the write, read and erase heads associated therewith.
Figure 3:
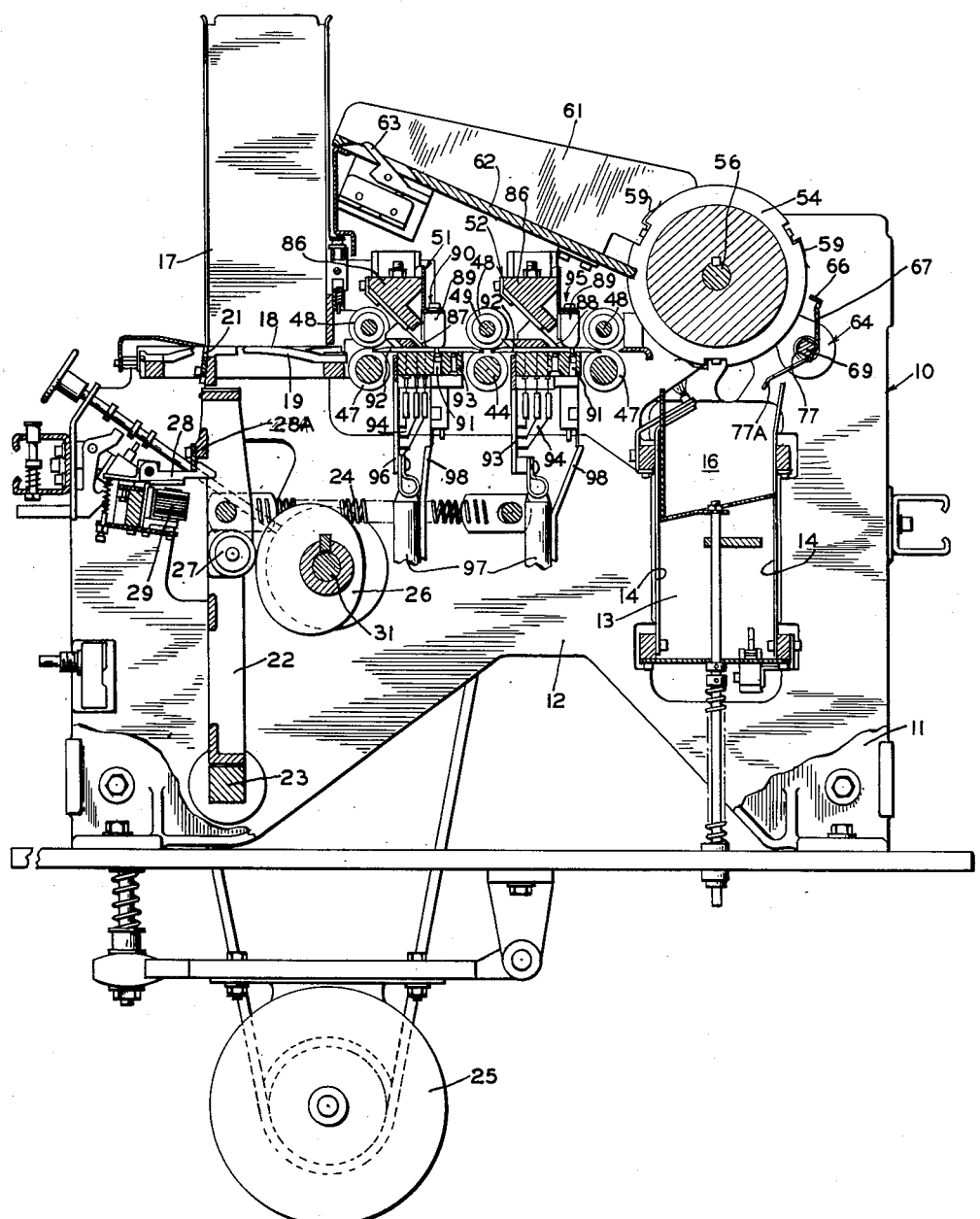
FIG. 3 is a vertical section taken through the machine from front to rear and shows the card handling and sensing mechanism.
Figure 8:
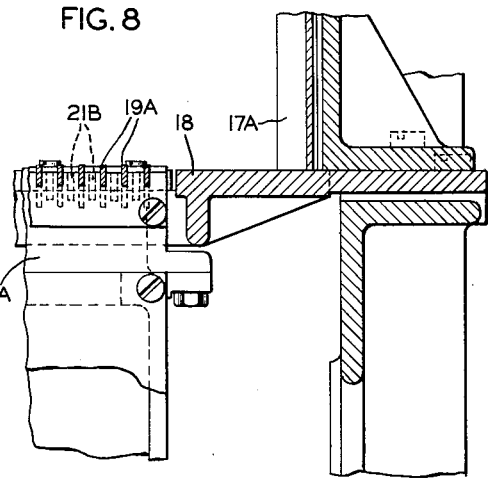
FIG. 8 is an enlarged fragmentary section taken on the line 8—8 of FIG. 6 showing the arrangement of the upper end of the card picker means and the grid with which it cooperates.
Figure 6:
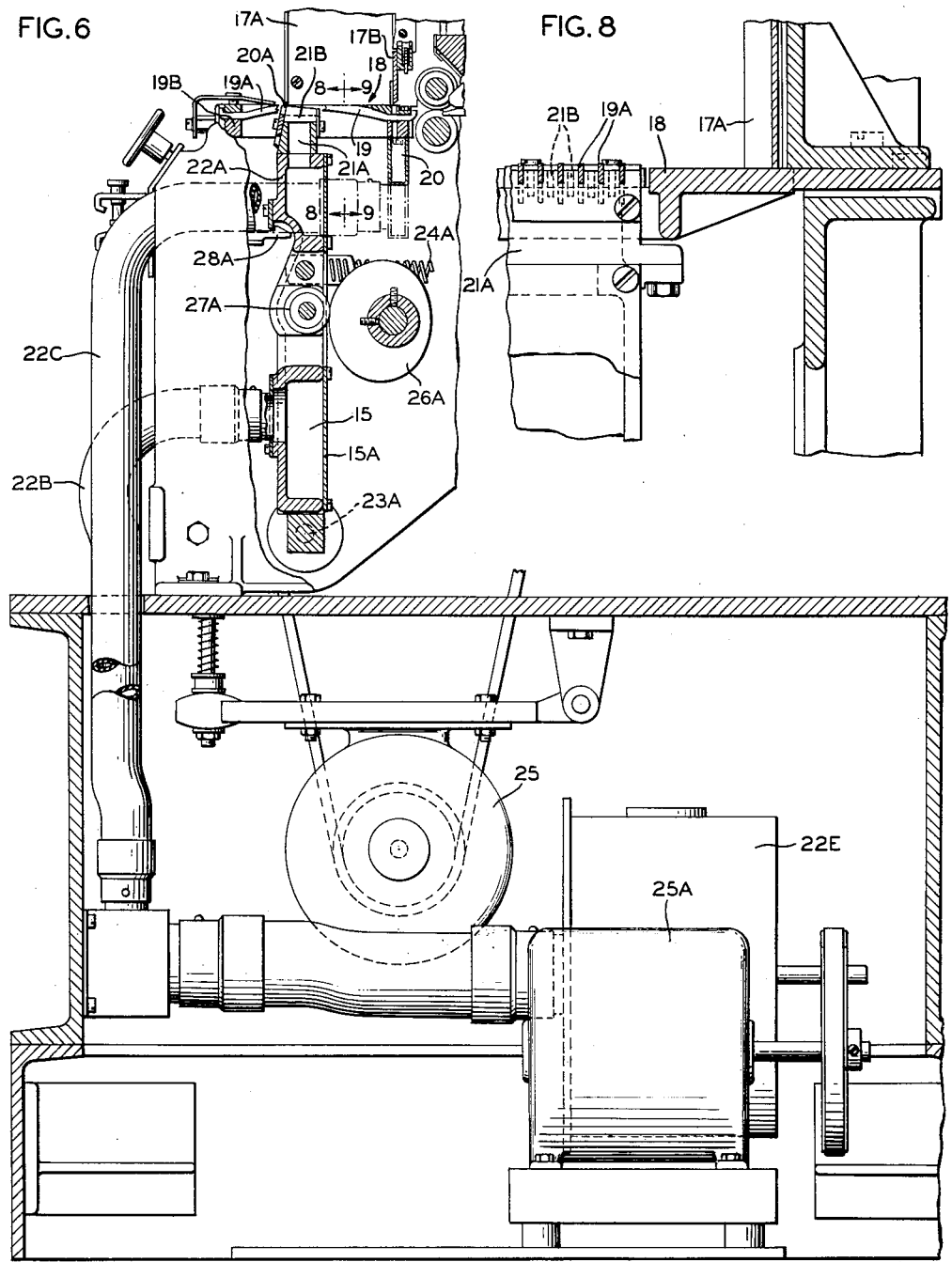
FIG. 6 is a partial view in sectional elevation of a modified form of card feeding device using air suction means for holding the card during feed thereof.
Figure 10:
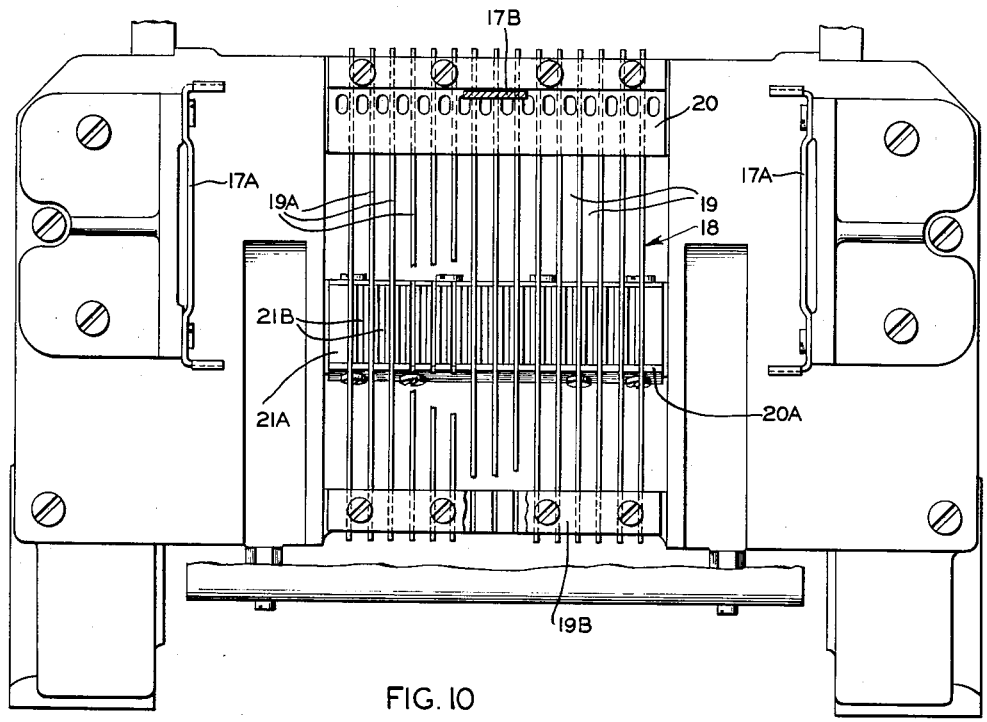
FIG. 10 is a plan view showing the card supporting grid in the bottom of the supply bin with the card feeding member in retracted position.
Figure 9:
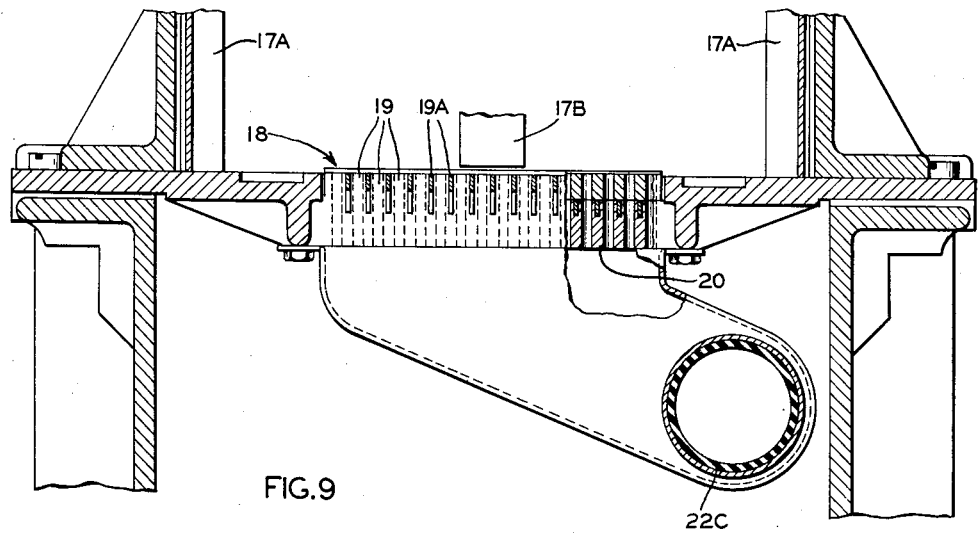
FIG. 9 is an enlarged fragmentary section taken on the line 9—9 of FIG. 6 showing the suction means at the discharge side of the card supply bin.

Referring to the drawing in detail and in particular to FIGS. 1–5, a card feeding and sensing mechanism is indicated at 10 which includes right and left side frames 11 and 12, respectively, shaped to provide openings 13, for the mounting of panels 14 forming the walls of a reject or error card pocket 16, and for the mounting of various cross shafts and bars. The cards to be fed to the machine are held in a supply or input bin 17, mounted on top of the frame at the front thereof, and are supported on a bottom grid 18 through the slots 19 of which a picker knife 21 is oscillated. The knife is adjustably attached to the upper end of a picker arm 22 mounted on a cross bar 23 pivoted in the side walls of the frame. The arm 22 is pulled forwardly by a spring 24 but controlled in its card feed and retract movements by a cam 26 against which bears a roller 27 carried on the arm 22. The cam is shaped to provide a slight overthrow in its retract movement of the arm so that a spring biased arm retaining latch 28, controlled by a magnet 29, is freed from the holding force exerted by the spring 24 on a catch 28A, to operate at a predetermined time to feed a card at precisely the proper instant. The cam 26 is secured on a main drive shaft 31, which is mounted in bearings 32 (FIG. 4) in the side frames and projects therebeyond at opposite ends as at 33 and 34.

The end 33 of the shaft has keyed thereto a pulley 36 driven from an adjustably mounted motor 25 (FIG. 3) by a belt while the end 34 of the shaft, at the right side of the machine, has keyed thereto a flywheel 38 and a pulley 39. The drive of the latter is transmitted by a belt 40 (FIG. 1) to three feed roller pulleys 41 and about idlers 42, and a belt tensioning means 43, which is mounted for adjustment on frame 11. The pulleys 41 are secured to the ends of lower feed roll shafts 44 (FIG. 4) journalled in bearings 46 and mounting laterally spaced feed rollers 47 which coact with feed rolls 48 mounted on upper feed roll shafts 49. The three sets of feed rolls, driven by the pulleys 41, are designated as the intake, intermediate and eject rolls and are equally spaced from each other to feed record cards successively through first and second sensing stations 51 and 52 respectively (FIG. 3), from the supply bin 17.

The upper and lower feed roll shafts are connected by meshing helical gears 53 (FIG. 2) and the upper shafts are supported at their opposite ends in bearings 54 mounted for vertical adjustment on the frame. The latter also supports bearings in which rotates a drum shaft 56 (FIG. 5) to which is secured a card stacking drum 57 disposed in the median line of the machine and flanked by laterally spaced card guide discs 58. The drum supports, at spaced intervals on its periphery, card holding clips 59 into which the cards are forced for transfer to an output or stacking bin 61, the bottom plate 62 of which arrests the movement of the cards and thus releases them from the clips as the latter pass downwardly through suitable slots in the drum end of said bottom plate. The latter is provided with a bin switch 63 for indicating a capacity condition of the bin 61.

When, as the result of a sensing at either sensing station an error routine is inaugurated in a circuit, an error card ejector 64 (FIGS. 3 and 5) is operated to swing the projecting upper ends 66 of a rock plate 67 into the path of a card carried in one set of the clips 59 to drop the error card into the error bin 16. The ejector is mounted on a cross rock bar 69, pivoted in the side frames, and protruding at the right end (FIG. 5) to support a magnet arm 71 operated by a magnet 72 (FIG. 1) when released by a latch 73 biased against an eject cam 74 by a spring 76. When the magnet is energized the arm 71 will be swung counterclockwise against the resistance of the coil springs 77, when the latch is moved to release position by any one of the lobes 74A equally spaced on the periphery of the cam so that an error card can be guided into the bin 16 by the deflector blades 77A. The lobes 74A have the same peripheral spacing as the clips 59 for flipping the latch 73 at the proper times in each cam rotation.

The drum shaft 56 (FIG. 2) carries a gear 78 which is driven by a gear train 79 in mesh with a pinion 81 fixed to the left end of the lowermost eject roll shaft 44. The drum rotates, for example, at a one to three ratio with respect to the card feed or picker knife cam 26 and at a one to six ratio with the feed rolls.

The lower feed roll shaft 44 for the intermediate feed rolls, disposed between the sensing stations, has secured to the extended left hand end thereof a magnetic pulse disc 82 (FIGS. 2 and 4) the periphery of which is coated with a magnetically susceptible material. Three magnetic heads are arranged about the periphery of the discs; a recording or write head 83, a read head 84 and an erase head 85 reading counterclockwise in FIG. 2 which is the direction in which the disc 82 and the lower feed rolls rotate in unison.

Each of the sensing stations 51 and 52 (FIGS. 3, 11 and 12) are substantially identical in structure and a description of one will suffice. The first sensing means may be referred to as the reading station while the second sensing means may be referred to as the checking station. Each station consists of a unit including a brush carrier bar 86 of dielectric material, removably supported between the side walls of the frame by opposed spring urged, manually releasable, latch strips 80 slidably mounted on top of the carrier 86 and biased into latching engagement with brackets 86A by springs 86B. The bottom wall of the carrier, disposed at an oblique angle, is slotted to hold forty-five or eighty or more metal brushes spaced laterally to coincide with the spacing of the columns of a statistical card. The banks of brushes 87 and 88, for the first and second sensing stations respectively, extend beyond the lower edge of the bar to wipe the card and, by applying voltage pulses, sense electrically the perforations, row by row. The bar 86 carries at the forward center edge thereof a casing 89 in which a lamp is housed to provide a beam of light for the operation of a phototube unit 91 used to detect the leading edge of the card as it passes through and breaks the beam, the tube and lamp combinations at the first and second sensing stations being referred to hereinafter as leading edge detectors 90 and 95 respectively. Both the phototube and the brushes are included in circuits, those of the brushes being energized when a brush, extending through a card perforation, wipes a metal contact strip 92 (FIGS. 11 and 12) of which there is one corresponding to each column of a card. The strips 92 are embedded in a holder of dielectric material constituting a base plate 93 disposed beneath each sensing station, the strips 92 being connected by wires 94 to a contact board 96 (FIG. 3) from the contacts of which, wires are led, in a cable 97, to a remote plug terminal. The phototube unit 91 is connected by wiring 98 to an amplifier, included in the circuit of FIG. 13 and as disclosed in the application above referred to.

A modified form of card feed mechanism is illustrated in FIGS. 6 to 10 and includes substantially the same mechanism as above described except that the picker arm is replaced by a pneumatic card feed arm 22A pivoted between the side frames of the machine as at 23A and carries at its upper end a picker knife 20A slotted to fit through a grid as explained below to engage the rear or trailing edge of the card. The arm is cored to provide a mounting for a cam roller 27A and an air chamber 15, the latter being closed by a plate 15A and opening at the top into a picker head 21A having an upper crenelate curved end, to fit in the slots 19 of the grid 18, and slotted as at 21B to provide card holding suction means. The grid is made up of longitudinally extending spaced strips 19A suitably mounted in a frame 19B constituting a support for the bin 17A. The picker arm 22A is oscillated by a cam 26A against the resistance of a spring 24A and is controlled by a latch 28A as before described. An exhaust fan 22E, driven from a motor 25A in the base of the machine, is used with ducts 22B and 22C for exhausting air from a slotted suction head or grille 20 extending across the exit side of the card magazine 17A.

As is well known, in the card sensing art, the output edge of the supply bin carries an adjustably mounted throat plate 17B, for allowing feed of a single card at a time, and having a very close tolerance which sometimes causes jamming by catching the uneven or mutilated leading edge of a card. When a card is pushed by the picker knife 20A, the suction provided by the slotted suction head 21A holds the leading edge of the card against the grid so that it passes beneath the throat plate without liability of catching thereon and causing a feeding jam. The suction provided by the picker arm assists in keeping the bottom card of the pile being fed, closely against the grid whose curvature conforms to the arcuate swing of the picker head. At the forward end of the swing, the suction of the arm is broken by reason of the card travelling across the flat top of the forward suction head 20. The grid strips 19A presenting longitudinal edges to the underside of the card offers minimum frictional resistance to the passage of the card along the grid.

Figure 13:
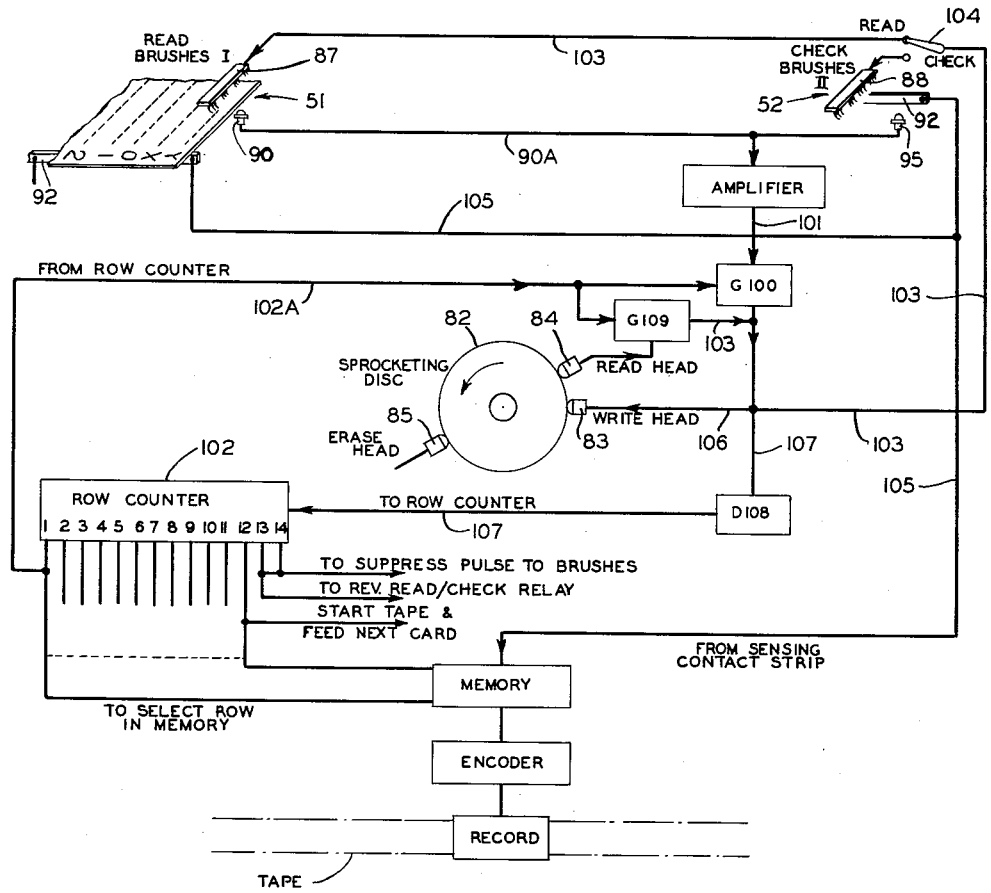
FIG. 13 is a diagrammatic illustration of the circuit connecting the sensing mechanism and the magnetic drum used in cooperation therewith.

While the present disclosure is related to card sensing mechanism, one of the principal objects of the invention is to coordinate data sensing with the feed of the card C, as shown in FIG. 13. As the card is detected at the first station 51 by the leading edge detector 90 a pulse generated in the common line 90A is amplified and fed through a line 101 to the write head 83 to apply a spot in the well known manner to the surface of the pulse transfer member or drum 82. The latter, operating in synchronism with the feed rolls will carry the magnetic spot to the read head 84 at the same time that the feed rolls advance the card to bring a row of holes to sensing position. The leading edge of the card is sensed by the detector 90 at the same time that the brush 87 is in register with the first row of holes and the pulse from the detector through line 101 is allowed to pass through gate G100; which was rendered permissive by a pulse via line 102A from a row counter 102 initially adjusted to row count "one." The leading edge pulse also goes to brush 87 via line 103 and through line 106 to the write head 83. A switch 104 in line 103 is adjustable to energize brush 88 for a "checking" operation but is shown in position to energize brush 87 for a first "reading" operation, which sends data pulses through line 105 to a memory unit. The leading edge pulse also operates through line 107 and a delay component D108 to stop the row counter after the brush 87 has been pulsed. After sensing of the first row, or when the counter steps to count "two" and thereafter until the card sensing is completed, the gate G109 is rendered permissive and the gate G100 inhibitive so that the initial pulse is circulated by the action of the drum 82 to sense each row of holes successively and to step the row counter.

The pulse circulating through the head 83 is carried as a spot by the drum 82 to the head 84 and through line 103 to pulse the brush as each row of holes comes thereunder and through line 106 back to the head 83 for recirculation. The distance the heads 83 and 84 are separated corresponds to the distance between rows of holes in the card. By suitably adjusting the speed of the disk or drum 82 the time necessary for transfer of the pulse spot between heads could also be very closely coordinated with the time taken to feed the card from one row of holes to the next. The drum 82 with its heads 83 and 84 constitute sensing pulse circulating means timed to card travel. The pulse spot, after passing the read head, is erased by the head 85.

The machine above disclosed is particularly adapted for use in a circuit controlling the input of data on a magnetized tape for use in a high speed computer and to this end, the error card control magnet 72 is energized when a suitable circuit is closed due to an error detection. This is also true of the magnet 29 used in controlling the operation of the card feeding picker arm latch 28A, and in view of the application above referred to, it is not deemed necessary to further disclose the circuitry of these agents. It is evident that, instead of the disc or drum 82, use may be made of a magnetizable web or belt to carry the signal from one head to the other.

The invention is not to be restricted to the precise details of construction shown since various changes and modifications may be made therein without departing from the scope of the invention or sacrificing the advantages to be derived from its use.

What is claimed is:

1. In a record controlled machine; record feeding means including picker arm means; means for oscillating said arm to feed records one at a time out of a supply bin, including a spring for pulling the arm in record feeding direction and a cam for retracting the arm; a latch for holding said arm in retracted position; magnet means for actuating said latch to free said arm; a catch forcibly engaging the latch under pressure of said spring to prevent operation of the latch by the magnet means and said cam being adapted to overthrow said arm and free the latch from said catch for operation by said magnet means.

2. In a card controlled machine; pulse operated means for sensing rows of data in a card; means for feeding the cards one at a time to the sensing means including picker arm means for feeding the cards out of a supply bin a spring for operating the picker arm means in card feeding direction, a picker arm cam for retracting said arm, a latch for holding said arm in retracted position and magnet means for controlling the operation of said latch to free said arm; feed roll means for advancing the cards through said sensing means; coacting card stacking drum and output bin means to which the cards are fed from said sensing means; means including a cam having lobes, for diverting the feed of the cards from the stacking means and means for operating said feed rolls and stacking means in unison.

3. A card controlled machine of the character set forth in claim 2 in which said sensing means includes spaced sensing stations and card detector means at each station, said detector and sensing means having a common pulse circuit and means for alternately including either sensing station and its detector means in the circuit.

4. A card controlled machine of the character set forth in claim 2 in which said picker means includes a pivoted spring pulled arm shaped to provide catch means, a cam for moving said arm against the action of said spring and to overthrow position a latch for engaging said catch means and held in arm arresting position by the pull of the spring, and circuit controlled means for retracting said latch when the arm is moved to an overthrow position.

5. A card controlled machine of the character set forth in claim 2 in which said feed roll means includes upper and lower shafts spaced longitudinally in pairs, coacting feed rolls, on said shafts, a magnetic sprocketing pulse disc on one of said shafts, means for successively recording reading and erasing from said disc a sprocket pulse representation, and means for driving all of said lower shafts in unison.

6. A card controlled machine of the character set forth in claim 2 in which said card stacking and output means includes a rotary drum to which the cards are fed, card holding clips at spaced points on the periphery said drum, a bin having one bottom end fitting about said drum for detaching the cards from said clips for stacking in the bin and means in the other end of said bottom for indicating a capacity condition of said bin.

7. A card controlled machine of the character set forth in claim 2 in which said card diverting means includes a pivoted rock bar, a plate on said bar shaped to provide upstanding projections and depending blades for deflecting a card from said drum, and means for rocking said bar to bring said projections into card diverting relation with said stacking drum, including means for oscillating said cross bar including a cam follower operated by said cam lobes and a circuit controlled latch releasable by the follower for rocking said cross bar.

8. In a card controlled machine; means for sensing a card; feed rolls for advancing a card through said sensing means; a stacking drum and an operating shaft therefor; card holding clips at spaced points on the periphery of said drum; means for revolving said drum at a speed less than the speed with which the cards are advanced for forcing said cards into the clips; a cam mounted on said drum shaft and revolving in unison with said drum and presenting lobes on the periphery thereof corresponding in position to the clips on the drum; card diverting means including a rock member presenting upstanding projections for detaching a card from the drum; a magnet actuated arm for swinging said rock member to bring the projections into card detaching relation with said clips; and an arm restraining latch, actuated by the lobes on said cam, for periodically releasing the arm for operation, when the magnet is energized, to remove a card from the clips.

9. In a record controlled machine, in combination; means for sensing data in record cards, means for feeding the cards to said sensing means including a hollow swingable arm; a spring for moving the arm in one direction; a cam for moving said arm in the opposite direction; a bin for holding cards to be fed to the sensing means; means for supporting the cards in the bin including strips extending in the direction of card feed and spaced to constitute a grid; card engaging means at the upper end of said arm, extending through said grid, and including a picker knife for engaging an edge of the card and a slotted head for suction adherence to the card to maintain said card in close contact with said grid during feeding movement; and means for exhausting air from said arm.

10. A card controlled machine of the character set forth in claim 9 including suction grille means beneath the exit wall of said bin and means connecting the air exhausting means of the head to said grille means to provide sliding adherence of the cards with said grille for passage beneath said exit wall.

11. In a record controlled machine including a card bin and throat member at the exit of the bin through which cards are fed one at a time; of a suction head beneath said throat member and means for exhausting air from said head to provide slidable adherence of the cards with the head for passage beneath said throat member.

12. In a card controlled machine, a record sensing means, record feeding means including hollow pivoted picker arm means; a bin for holding records to be fed to the sensing means including a grid; means for oscillating said arm means; record engaging slotted head means at the upper end of said arm means, said head means extending through said grid for feeding the records out of the bin one at a time; suction grille means beneath the exit wall of the bin; and means common to both said arm means and said grille means for exhausting air therefrom to provide sliding adherence of the records with the grid and grille for passage beneath said exit wall.

References Cited in the file of this patent
UNITED STATES PATENTS

| | | |
|---|---|---|
| 1,633,936 | Ford | June 28, 1927 |
| 1,944,678 | Ziguelde | Jan. 23, 1934 |
| 2,093,566 | Lake | Sept. 21, 1937 |
| 2,319,108 | Broido | May 11, 1943 |
| 2,484,114 | Page et al. | Oct. 11, 1949 |
| 2,566,927 | Carroll et al. | Sept. 4, 1951 |
| 2,569,799 | Carroll et al. | Oct. 2, 1951 |
| 2,617,648 | Wockenfuss | Nov. 11, 1952 |
| 2,618,386 | Samain | Nov. 18, 1952 |
| 2,624,511 | Manning | Jan. 6, 1953 |
| 2,693,277 | Wagner et al. | Nov. 2, 1954 |
| 2,702,380 | Brustman et al. | Feb. 15, 1955 |
| 2,705,142 | Gollwitzer | Mar. 29, 1955 |